United States Patent
Yoshioka et al.

(10) Patent No.: US 11,565,209 B2
(45) Date of Patent: Jan. 31, 2023

(54) HONEYCOMB FILTER

(71) Applicant: NGK Insulators, Ltd., Nagoya (JP)

(72) Inventors: Fumihiko Yoshioka, Nagoya (JP); Yudai Kurimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/457,332

(22) Filed: Dec. 2, 2021

(65) Prior Publication Data
US 2022/0305420 A1    Sep. 29, 2022

(30) Foreign Application Priority Data

Mar. 23, 2021   (JP) .............................. JP2021-048823

(51) Int. Cl.
*B01D 46/00* (2022.01)
*B01D 46/24* (2006.01)

(52) U.S. Cl.
CPC ......... *B01D 46/249* (2021.08); *B01D 46/247* (2013.01); *B01D 46/2429* (2013.01); *B01D 46/2455* (2013.01); *B01D 46/2474* (2013.01); *B01D 46/2482* (2021.08); *B01D 46/2484* (2021.08); *B01D 46/24491* (2021.08); *B01D 2279/30* (2013.01)

(58) Field of Classification Search
None
See application file for complete search history.

(56) References Cited

U.S. PATENT DOCUMENTS

| 2008/0271422 | A1* | 11/2008 | Zawisza | B01D 46/2486 55/419 |
| 2014/0272279 | A1* | 9/2014 | Aoyama | C04B 35/565 428/116 |
| 2016/0069308 | A1* | 3/2016 | Miyairi | B01D 46/249 55/529 |

FOREIGN PATENT DOCUMENTS

JP        2011-189252 A    9/2011

* cited by examiner

*Primary Examiner* — Mary I Omori
(74) *Attorney, Agent, or Firm* — Burr & Brown, PLLC

(57) ABSTRACT

A honeycomb filter includes a honeycomb structure body having a porous partition wall disposed to surround a plurality of cells and a plugging portion disposed at one end of the cells, wherein the plurality of cells are arranged in a square grid pattern along a first direction and a second direction in a section orthogonal to an extending direction of the cells, the shape in the section is a deformed square having a specific corner, the specific corner includes a first curved portion, a second curved portion, and a connecting portion, a radius of curvature R1 of the first curved portion and a radius of curvature R2 of the second curved portion are 40 to 80 μm, respectively, and a center distance between a center of curvature O1 of the first curved portion and a center of curvature O2 of the second curved portion is 80 to 200 μm.

4 Claims, 5 Drawing Sheets

HONEYCOMB FILTER

The present application is an application based on JP 2021-048823 filed on Mar. 23, 2021 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter which is excellent in thermal shock resistance, has high isostatic strength, and can realize a reduction in pressure loss.

Description of the Related Art

In various industries, internal combustion engines are used as a power source. On the other hand, exhaust gas emitted by the internal combustion engine during the combustion of fuels contains particulate matters such as soot and ashes together with toxic gases such as nitrous oxides. Hereinafter, the particulate matter may be referred to as "PM". The "PM" is an abbreviation for "Particulate Matter". Recently, regulations on removing PM emitted from the diesel engine has become stricter worldwide, as a filter for removing PM, for example, a wall flow type filter having a honeycomb structure is used.

As the wall flow type filter, various honeycomb filters having a honeycomb structure body in which a plurality of cells serving as fluid through channels is defined by a porous partition wall, and a plugging portion disposed on one of open end of the plurality of cells, have been proposed (e.g., see Patent Document 1). In such a honeycomb filter, for example, inflow cells in which the plugging portion is disposed on the outflow end face side and outflow cells in which the plugging portion is disposed on the inflow end face side are alternately arranged with the partition wall therebetween, and the porous partition wall serves as a filter for removing PM. In a section orthogonal to the extending direction of the cells of the honeycomb structure body, the plurality of cells are defined in a grid pattern by the porous partition wall, and the shape of the cells in the section is, for example, a square or the like. Hereinafter, the shape of the cells in the section orthogonal to the extending direction of the cells of the honeycomb structure body is simply referred to as a "cell shape". For example, a cell having a square cell shape may be simply referred to as a "square cell".

[Patent Document 1] JP-A-2011-189252

SUMMARY OF THE INVENTION

Recently, in order to prevent damages due to excessive thermal shock or mechanical shock occurring at the intersection of the partition wall of the honeycomb structure body used in the honeycomb filter, a technique of providing an R-shaped reinforcing portion having a desired radius of curvature at each corner of the square cell has been proposed.

It is assumed that it is possible to improve thermal shock resistance of the honeycomb filter by providing the R-shaped reinforcing portion at each corner of the square cell as described above. However, if provided with R-shaped reinforcing portion so as to satisfy a sufficiently thermal shock resistance to the corners of the square cell, there may be other issues such as increase in pressure loss of the honeycomb filter.

Further, in recent years, the honeycomb filter for purifying exhaust gas emitted from the engine such as an automobile engine, reduction of pressure loss is required in order to improve the fuel efficiency of the automobile. Measures to reduce pressure loss include, for example, "thinning of the wall" to reduce the thickness of the partition wall of the honeycomb structure body and "increasing the porosity" to further increase porosity of the partition wall compared to the conventional one. However, thinning of the wall and increasing the porosity of the partition wall of the honeycomb structure body may cause deterioration of thermal shock resistance and isostatic strength of the honeycomb filter, and it is desired to develop a honeycomb filter having excellent thermal shock resistance and isostatic strength.

The present invention has been made in view of the problems with the prior arts described above. The present invention provides a honeycomb filter which is excellent in thermal shock resistance, has high isostatic strength, and can realize a reduction in pressure loss.

According to the present invention, a honeycomb filter described below is provided.

[1] A honeycomb filter including: a honeycomb structure body having a porous partition wall disposed so as to surround a plurality of cells serving as fluid through channels extending from an inflow end face to an outflow end face; and a plugging portion disposed so as to plug end at any one of the inflow end face side or the outflow end face side of the cells, wherein the plurality of cells are arranged in a square grid pattern along a first direction and a second direction orthogonal to the first direction in a section orthogonal to an extending direction of the cells of the honeycomb structure body, the shape of the cell in the section is a deformed square having a specific corner in which a part of the corner including one apex of the square is lacking, an intersection of the square grid is formed by the specific corner of each of the four cells arranged in the square grid pattern, the specific corner of the cell includes a first curved portion having a radius of curvature R1 continuous from a first side extending in the first direction of the four sides constituting the main outline of the deformed square, a second curved portion having a radius of curvature R2 continuous from a second side extending in the second direction of the four sides, and a connecting portion connecting the first curved portion and the second curved portion, the radius of curvature R1 of the first curved portion and the radius of curvature R2 of the second curved portion are 40 to 80 μm, respectively, and a center distance between a center of curvature O1 of the first curved portion and a center of curvature O2 of the second curved portion is 80 to 200 μm.

[2] The honeycomb filter according to [1], wherein a porosity of the partition wall is 45 to 65%.

[3] The honeycomb filter according to [1] or [2], wherein a thickness of the partition wall is 0.15 to 0.26 mm.

[4] The honeycomb filter according to any one of [1] to [3], wherein a cell density of the honeycomb structure body is 30 to 50 cells/cm$^2$.

The honeycomb filter of the present invention has the effects of excellent thermal shock resistance, high isostatic strength, and reduction in pressure loss.

DESCRIPTION OF THE PREFERRED EMBODIMENTS

Hereinafter, the embodiments of the present invention will be described. However, the present invention is not limited to the following embodiments. Therefore, it should be understood that changes, improvements, and the like may be appropriately added to the following embodiments based on ordinary knowledge of a skill in the art without departing from the spirit of the present invention.

Figure 1:
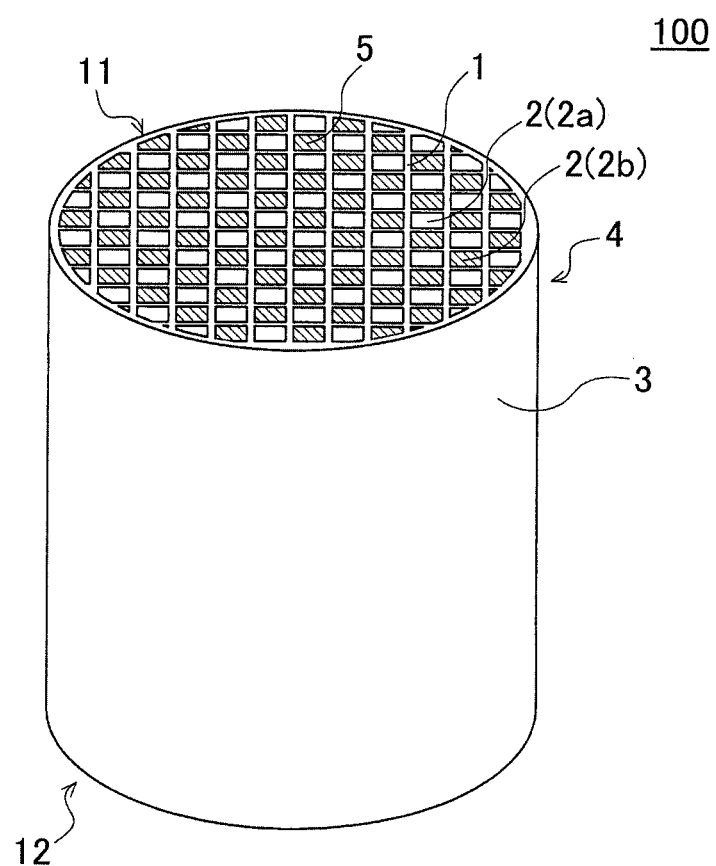
FIG. 1 is a perspective view schematically showing one embodiment of the honeycomb filter of the present invention as viewed from an inflow end face side.
Figure 2:
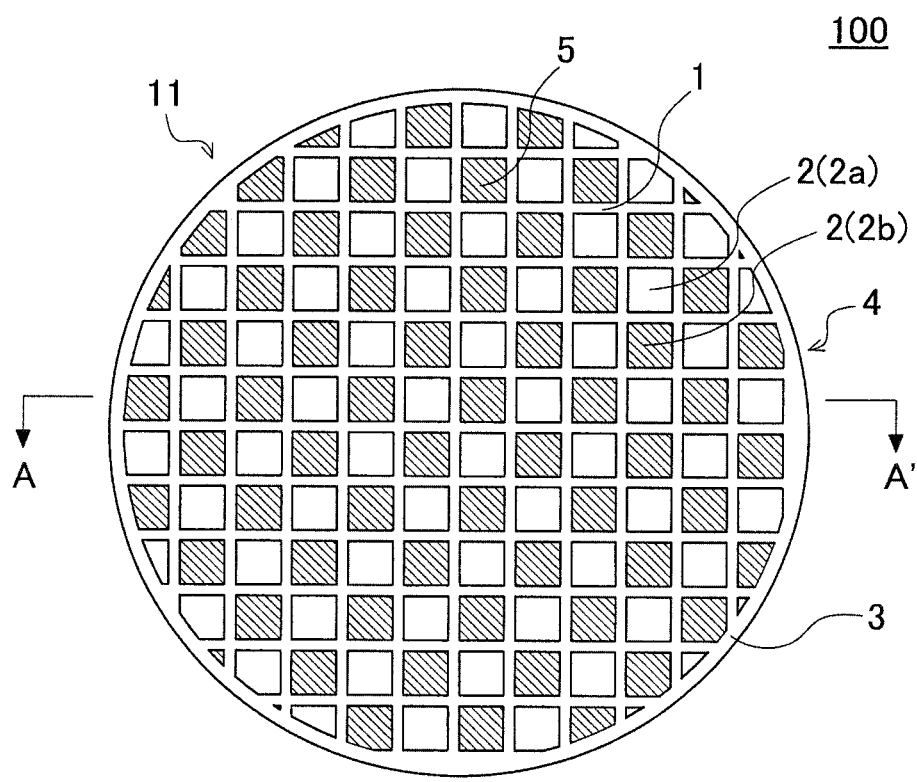
FIG. 2 is a plan view schematically showing the inflow end face of the honeycomb filter shown in FIG. 1.
Figure 3:
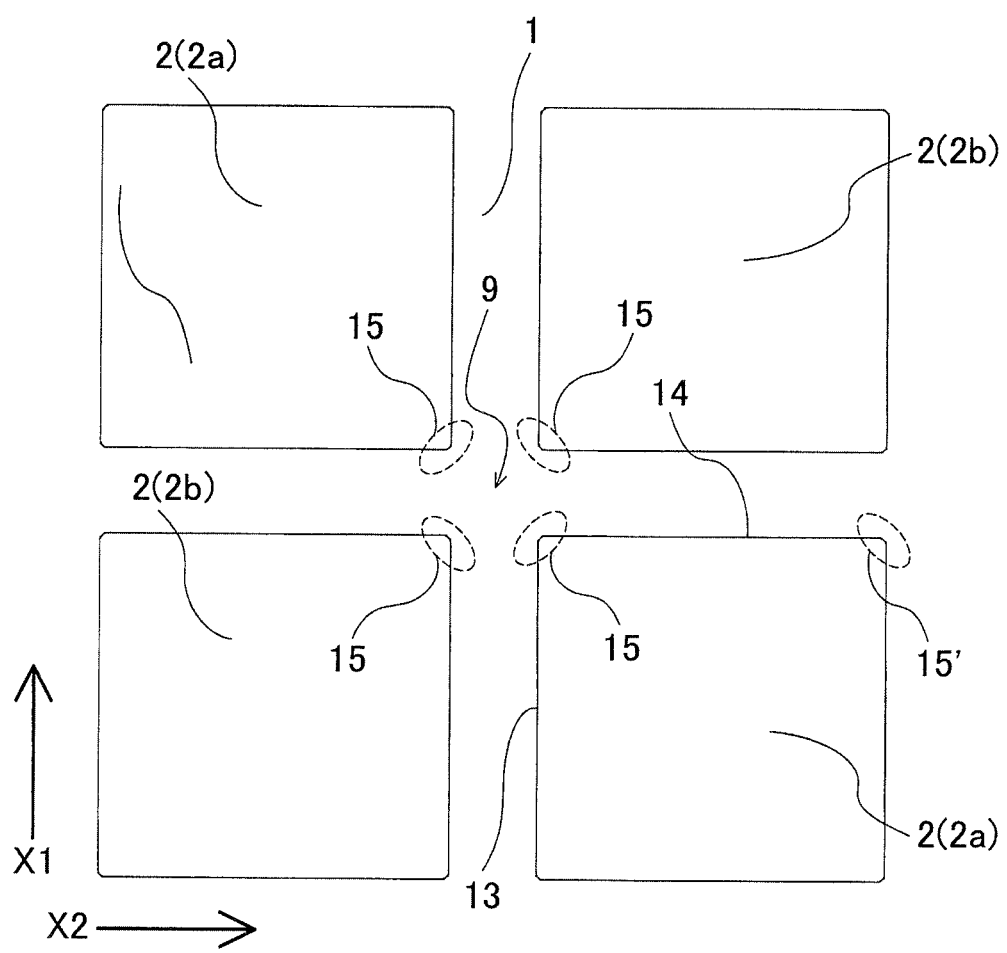
FIG. 3 is an enlarged schematic plan view schematically showing a part of the inflow end face of the honeycomb filter shown in FIG. 2.
Figure 4:
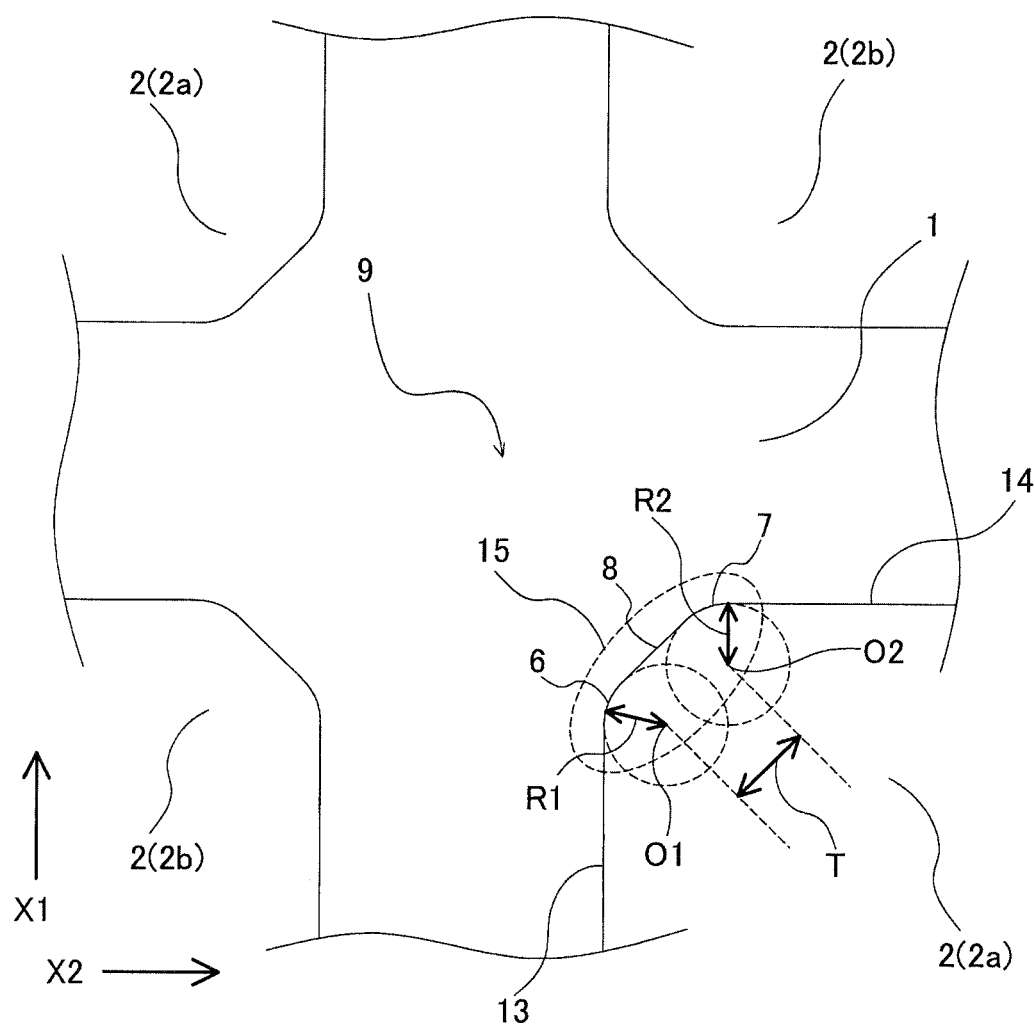
FIG. 4 is an enlarged schematic plan view further enlarged vicinity of the intersection of the partition wall shown in FIG. 3.
Figure 5:
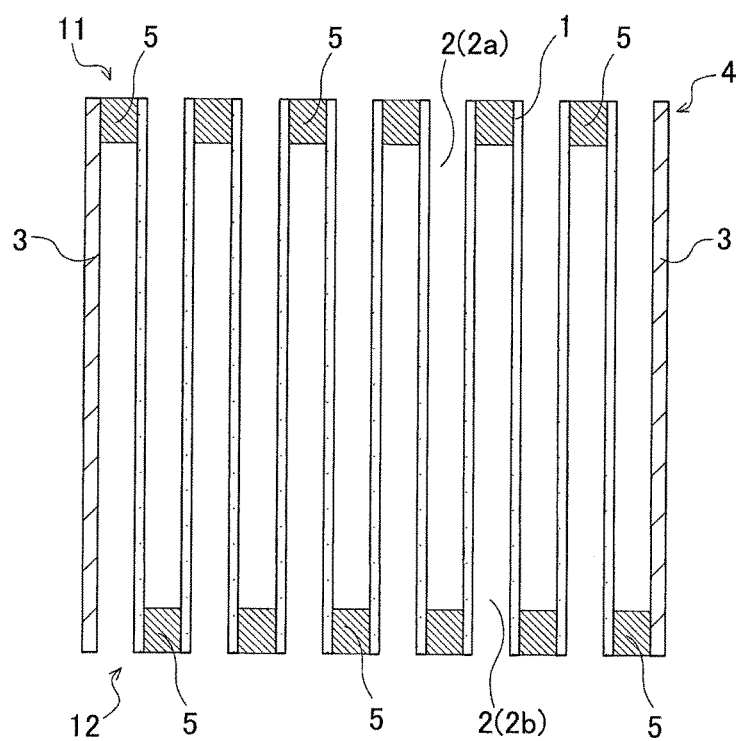
FIG. 5 is a sectional view schematically showing a section taken along the line A-A' of FIG. 2.

(1) Honeycomb filter:

Referring to FIGS. 1-5, an embodiment of the honeycomb filter of the present invention will be described. Here, FIG. 1 is a perspective view schematically showing an embodiment of the honeycomb filter of the present invention as viewed from an inflow end face side. FIG. 2 is a plan view schematically showing the inflow end face of the honeycomb filter shown in FIG. 1. FIG. 3 is an enlarged schematic plan view schematically showing a part of the inflow end face of the honeycomb filter shown in FIG. 2. FIG. 4 is an enlarged schematic plan view further enlarged vicinity of the intersection of the partition wall shown in FIG. 3. FIG. 5 is a sectional view schematically showing a section taken along the line A-A' of FIG. 2.

The honeycomb filter 100 includes a honeycomb structure body 4 and a plugging portion 5. The honeycomb structure body 4 is a pillar-shaped having an inflow end face 11 and an outflow end face 12. The honeycomb structure body 4 has a porous partition wall 1 disposed so as to surround a plurality of cells 2 extending from the inflow end face 11 to the outflow end face 12. The honeycomb structure body 4 shown in FIG. 1 or the like further includes a circumferential wall 3 disposed so as to encompass the partition wall 1. In the present invention, the cells 2 refer to a space surrounded with the partition wall 1. The plurality of cells 2 serve as fluid through channels.

The plugging portion 5 is disposed at either end of the inflow end face 11 side or outflow end face 12 side of the cell 2 formed in the honeycomb structure body 4, and is intended to plug open end of the cell 2. Hereinafter, the cell 2 in which the plugging portion 5 is disposed at the end of the outflow end face 12 side is referred to as "inflow cell 2a", and the cell 2 in which the plugging portion 5 is disposed at the end of the inflow end face 11side is referred to as "outflow cell 2b".

The plurality of cells 2 are arranged in a square grid pattern along a first direction X1 and a second direction X2 orthogonal to the first direction X1 in the section orthogonal to the extending direction of the cells 2 of the honeycomb structure body 4. Hereinafter, the "section orthogonal to the extending direction of the cells 2 of the honeycomb structure body 4" is also simply referred to as the "section of the honeycomb structure body 4". The above-mentioned "first direction" is a vertical direction of the paper surface in FIGS. 3 and 4, and the above-mentioned "second direction" is a horizontal direction of the paper surface in FIGS. 3 and 4. In FIGS. 3 and 4, it is drawn in the form of abstracting the plugging portion 5 disposed on open end of the cell 2 of the inflow end face 11 side of the honeycomb filter 100.

In the honeycomb filter 100, as shown in FIGS. 2 to 4, the shape of the cell 2 in the section of the honeycomb structure body 4 is a deformed square having a specific corner 15 in which a part of the corner including one apex of the square is lacking. In particular, it is preferable that the shape of the cell 2 is a deformed square having a specific corner 15 in which a part of each corner including each apex of the square is lacking. The intersection 9 of the square grid is formed by a specific corner 15 of each of the four cells 2 arranged in the square grid pattern. As described above, the cells 2 refer to a space surrounded by the partition wall 1. For this reason, the lack of a part of the corner of the square with respect to the shape of the cell 2 means that the space of the cell 2, which is the corner of the square, is occupied by the partition wall 1 surrounding the cell 2.

The specific corner 15 of the cell 2 includes a first curved portion 6, a second curved portion 7, and a connecting portion 8, which are configured as follows. The first curved portion 6 is a curved portion having a radius of curvature R1 continuous from a first side 13 extending in the first direction X1 of the four sides constituting the main outline of the deformed square. The second curved portion 7 is a curved portion having a radius of curvature R2 continuous from a second side 14 extending in the second direction X2 of the four sides constituting the main outline of the deformed square. The first side 13 and the second side 14 are two sides for constituting the specific corner 15 of interest, among the four sides constituting the main outline of the deformed square. The connecting portion 8 is a connecting portion that connects the first curved portion 6 and the second curved portion 7 as described above. The connecting portion 8 is preferably formed in a straight line in the section of honeycomb structure body 4.

As described above, in the honeycomb filter 100 of the present embodiment, the specific corner 15 of the cell 2 includes the first curved portion 6 and the second curved portion 7, which are two curved portions, and the connecting portion 8 connecting them. Therefore, an example of the shape of the cell 2 in the section of the honeycomb structure body 4 is a deformed square obtained by chamfering the corners of the square and then chamfering the respective ends of the chamfered portion into R shapes having the radius of curvature R1 and the radius of curvature R2.

In the honeycomb filter 100 of the present embodiment, the radius of curvature R1 of the first curved portion 6 and the radius of curvature R2 of the second curved portion 7 are 40 to 80 μm, respectively. Further, a center distance T between a center of curvature O1 of the first curved portion 6 and a center of curvature O2 of the second curved portion 7 is 80 to 200 μm.

The honeycomb filter 100 of the present embodiment configured as described above is excellent in thermal shock resistance, has high isostatic strength, and can realize a reduction in pressure loss. For example, when the center distance T between the center of curvature O1 of the first curved portion 6 and the center of curvature O2 of the second curved portion 7 is less than 80 µm, the isostatic strength is lowered. On the other hand, when the center distance T between the center of curvature O1 of the first curved portion 6 and the center of curvature O2 of the second curved portion 7 exceeds 200 µm, pressure loss is increased. Further, when one or both of the radius of curvature R1 and the radius of curvature R2 is less than 40 µm, thermal shock resistance is reduced. On the other hand, when one or both of the radius of curvature R1 and the radius of curvature R2 exceeds 80 µm, pressure loss is increased.

The radius of curvature R1 of the first curved portion 6 and the radius of curvature R2 of the second curved portion 7 are 40 to 80 µm, respectively, and are not particularly limited, but are preferably 45 to 75 µm, for example. The radius of curvature R1 of the first curved portion 6 and the radius of curvature R2 of the second curved portion 7 may have the same value or different values. That is, the radius of curvature R1 of the first curved portion 6 and the radius of curvature R2 of the second curved portion 7 may be curved portions having the same curvature or curved portions having different curvatures.

The center distance T between the center of curvature O1 of the first curved portion 6 and the center of curvature O2 of the second curved portion 7 is 80 to 200 µm, and is not particularly limited, but is preferably 100 to 180 µm, for example.

The radius of curvature R1 of the first curved portion 6 and the radius of curvature R2 of the second curved portion 7 can be measured by the following method. The radius of curvature R1 of the first curved portion 6 and the radius of curvature R2 of the second curved portion 7 are values measured by a microscope. As the microscope, for example, a VHX-6000 (trade name) manufactured by KEYENCE Corporation can be mentioned. Hereinafter, a more specific measurement method will be described by taking the case of measuring the radius of curvature R1 of the first curved portion 6 as an example. First, a section orthogonal to the extending direction of the cell 2 of the honeycomb filter 100 is photographed, and a portion having a curvature constituting the first curved portion 6 is confirmed from the sectional image of the photographed honeycomb filter 100. Specifically, two points of one end corresponding to the boundary between the straight sides constituting the main outline of the deformed square and the first curved portion 6 and the other end corresponding to the boundary between the first curved portion 6 and the straight connecting portion 8 are found. Further, an intermediate point which is equidistant from the two points of the one end and the other end is found on the first curved portion 6. Then, a radius of the circle contacting three points of the one end of the first curved portion 6, the intermediate point, and the other end, is the radius of curvature R1 of the first curved portion 6. The center of the circle contacting the three points of one end, the intermediate point, and the other end of the first curved portion 6 is the center of curvature O1 of the first curved portion 6. The radius of curvature R2 and the center of curvature O2 of the second curved portion 7 can be determined in the same manner.

The center distance T between the center of curvature O1 of the first curved portion 6 and the center of curvature O2 of the second curved portion 7 can be measured by specifying the positions of the center of curvature O1 of the first curved portion 6 and the center of curvature O2 of the second curved portion 7 by the method described above and determining the distance between the two points.

It is preferable that the cells 2 of the deformed square have the specific corners 15 at each vertex of the square. For example, as shown in FIG. 3, in the cell 2 of the deformed square, a specific corner 15' different from one specific corner 15 preferably includes the same components as the first curved portion 6, the second curved portion 7, and the connecting portion 8 of the specific corner 15 as shown in FIG. 4. It is preferable that the radius of curvature R1 of the first curved portion 6 and the radius of curvature R2 of the second curved portion 7 of such a specific corner 15' (see FIG. 3) are also 40 to 80 µm, respectively, and that the center distance T between the center of curvature O1 of the first curved portion 6 and the center of curvature O2 of the second curved portion 7 is also 80 to 200 µm. Further, the other specific corner 15 of the cells 2 of the deformed square is preferably configured in the same manner as the specific corner 15 described above.

Although there is no particular limitation on the number of cells 2 having a specific corner 15, it is preferable that the cells 2 of 50% or more with respect to the number of all cells have a specific corner 15 from the viewpoint of the strength of the honeycomb filter 100. Here, the "number of all cells" means the total number of the cells 2 in which all peripheries of the cells 2 are surrounded by partition wall 1. Hereinafter, a cell 2 in which all peripheries of the cell 2 is surrounded by the partition wall 1 may be referred to as a "complete cell". On the other hand, a cell 2 in which not all the peripheries of the cell 2 is surrounded by the partition wall 1 and a part of the cell 2 is partitioned by the circumferential wall 3 may be referred to as an "incomplete cell". Therefore, the number of the incomplete cells is not included in the "number of all cells" described above.

Further, the cell 2 having the specified corner 15 is preferably provided in the circumferential region of the section of the honeycomb structure body 4 from the viewpoint of the strength of the honeycomb filter 100. The "circumferential region" means a region outside the center of the section of the honeycomb structure body 4 by 30% or more of its radius.

In the honeycomb filter 100, a porosity of the partition wall 1 of the honeycomb structure body 4 is preferably 45 to 65%, more preferably 50 to 60%. If the porosity of the partition wall 1 is too low, pressure loss may increase. If the porosity of the partition wall 1 is too high, the strength of the honeycomb structure body 4 becomes insufficient, and it may become difficult to hold the honeycomb filter 100 with a sufficient gripping force when the honeycomb filter 100 is housed in the can body used in the exhaust gas purifying device. The porosity of the partition wall 1 is measured by a mercury porosimeter. As the mercury porosimeter, for example, Autopore 9500 (trade name) manufactured by Micromeritics Corporation can be mentioned.

In the honeycomb filter 100, a thickness of the partition wall 1 is preferably 0.15 to 0.26 mm, more preferably 0.18 to 0.23 mm. The thickness of the partition wall 1 is a length in the direction orthogonal to the surface of the partition wall 1 which partitions two cells 2 in the section of the honeycomb structure body 4. The "partition wall 1 which partitions two cells 2" in measuring the thickness of the partition wall 1 does not include the thickness of the partition wall 1 corresponding to the portion constituting the specified corner 15 of the cell 2. That is, as described above, the "thickness of the partition wall 1" does not include the thickness of the intersection 9 of the partition wall 1, and is the thickness of the partition wall 1 of the portion partitions the four sides constituting the main outline of the cell 2 of the deformed square, unless otherwise specially noted. The thickness of the partition wall 1 can be measured using, for example, a microscope.

In the honeycomb filter 100, a cell density of the honeycomb structure body 4 is preferably 30 to 50 cells/cm$^2$, more preferably 30 to 40 cells/cm$^2$. With this configuration, it can be suitably used as a filter for trapping PM in exhaust gas emitted from engines of automobiles or the like. If the cell density is too low, the isostatic strength may be reduced, and if the cell density is too high, pressure loss may be increased.

The material of the partition wall 1 is not particularly limited. Examples of the material of the partition wall 1 include ceramics. In particular, the partition wall 1 preferably comprises silicon carbide, silicon-bonded silicon carbide, binder sintered type ceramic materials, mullite, cordierite or aluminium titanate. Note that "silicon-bonded silicon carbide" means, for example, silicon carbide particles as an aggregate bonded by metallic silicon, and that "binder sintered type ceramic material" means a ceramic material, for example, in which an aggregate such as silicon carbide or mullite is bonded by a binder such as cordierite, and produced by sintering.

The material of the plugging portion 5 is not particularly limited, and those mentioned as the material of the partition wall 1 described above can be suitably used.

The overall shape of the honeycomb filter 100 is not particularly limited. In the overall shape of the honeycomb filter 100, the shape of the inflow end face 11 and the outflow end face 12 is preferably circular or elliptical, particularly preferably circular. The size of the honeycomb filter 100, for example, the length from the inflow end face 11 to the outflow end face 12 of honeycomb structure body 4 and the size of the section orthogonal to the extending direction of the cells 2 of the honeycomb structure body 4, is not particularly limited. Each size may be selected as appropriate such that optimum purification performance is obtained when the honeycomb filter 100 is used as a filter for purifying exhaust gas.

Next, the method of manufacturing the honeycomb filter of the present embodiment will be described. However, the method of manufacturing the honeycomb filter is not limited to the manufacturing method described below.

First, a plastic kneaded material for producing the honeycomb structure body is prepared. The kneaded material for producing the honeycomb structure body can be prepared by adding an additive such as a binder, and water, as appropriate, to a material selected from the group of aforementioned suitable materials of the partition wall as a raw material powder.

The prepared kneaded material is then extruded to obtain a pillar-shaped honeycomb formed body having a partition wall defining a plurality of cells and a circumferential wall disposed on outermost circumference. In the extrusion, a die for extrusion in which a slit of an inverted shape of the honeycomb formed body to be molded is formed in the extruded surface of the kneaded material can be used. For example, an extrusion method using a die corresponding to a desired cell shape, partition wall thickness, or the like can be given as a preferable example. For example, the cell shape in the die may include a deformed square having a specific corner 15 in which a portion of each apex of the square is lacking (e.g., see FIG. 3), described so far. As the material of the die, cemented carbide that does not easily wear is preferable. The obtained honeycomb formed body may be dried, for example, with microwaves and hot air.

Next, a plugging portion is formed by plugging open end of the cell with a material similar to the material used to manufacture the honeycomb formed body. The method of forming the plugging portion can be performed in accordance with a conventionally known method of manufacturing the honeycomb filter. For example, first, a plugging material containing raw material for forming a plugging portion is prepared. Next, the inflow end face of the honeycomb formed body is provided with a mask so that the inflow cell is covered. Next, the open end of the outflow cell without the mask on the inflow end face side of the honeycomb formed body is filled with the prepared plugging material. After that, also in the outflow end face of the honeycomb formed body, the open end of the inflow cell is filled with the plugging material in the same manner to the above.

The obtained honeycomb formed body is then fired to obtain a honeycomb filter. The firing temperature and the firing atmosphere differ depending on the raw material, and those skilled in the art can select the firing temperature and the firing atmosphere that are the most suitable for the selected material.

EXAMPLES

The following will describe in more detail the present invention by examples, but the present invention is not at all limited by these examples.

Example 1

A kneaded material is prepared by adding a pore former of 10 parts by mass, a dispersing medium of 20 parts by mass, and an organic binder of 1 part by mass to a cordierite forming raw material of 100 parts by mass, and by mixing and kneading these. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, cokes having an average particle diameter of 15 μm were used.

Next, the kneaded material was extruded using a die for producing a honeycomb formed body to obtain a honeycomb formed body having a round pillar shape as the overall shape. The cell shape of the honeycomb formed body was a deformed square having a specific corner in which a portion of each apex of the square is lacking.

Next, the honeycomb formed body was dried by a microwave dryer, and then was dried completely by a hot-air dryer, and then both end faces of the honeycomb formed body were cut so as to have predetermined dimensions.

Next, a plugging material for forming the plugging portion was prepared. Then, plugging portions were formed on the open end of the inflow end face side of a predetermined cell and the open end of the outflow end face side of the remaining cell of the dried honeycomb formed body with the prepared plugging material.

Next, the honeycomb formed body having the plugging portions formed was degreased and fired to manufacture the honeycomb filter of Example 1.

The honeycomb filter of Example 1 had a round pillar shape in which the shapes of the inflow end face and the outflow end face were circular. The diameters of the inflow end face and outflow end face of the honeycomb filter were 132 mm. The length in the extending direction of the cells of the honeycomb structure was 120 mm.

In the honeycomb filter of Example 1, a cell density was 34 cells/cm$^2$, a thickness of the partition wall was 0.15 mm, and a porosity of the partition wall was 48%. Table 1 shows Cell density (cells/cm$^2$), Partition wall thickness (mm), and Porosity (%) of the partition wall. The porosity of the partition wall was measured using Autopore 9500 (trade name) manufactured by Micromeritics.

The cell shapes in the honeycomb filter of Example 1 were deformed squares having the specific corners in which a part of each apex of the squares were lacking. The specific corner of the deformed square included a first curved portion having a radius of curvature R1 of 60 µm, a second curved portion having a radius of curvature R2 of 60 µm, and a connecting portion connecting the first curved portion and the second curved portion. The value of the radius of curvature R1 of the first curved portion (µm) and the value of the radius of curvature R2 of the second curved portion (µm) are shown in Table 1. Incidentally, the radius of curvature R1 of the first curved portion (µm) and the radius of curvature R2 of the second curved portion (µm) were measured by the following method.

Measurement of the Radius of Curvature R1 and the Radius of Curvature R2

The radius of curvature R1 of the first curved portion and the radius of curvature R2 of the second curved portion were measured by a microscope (VHX-6000 (trade name)) manufactured by KEYENCE Corporation. Specifically, first, a section orthogonal to the extending direction of the cells of the honeycomb filter was photographed, and a portion having a curvature constituting the first curved portion was confirmed from the sectional image of the photographed honeycomb filter as follows. First, it was confirmed the position of two points of one end corresponding to the boundary between straight sides constituting the main outline of the deformed square of the cell and the first curved portion, and the other end corresponding to the boundary between the first curved portion and the straight connecting portion. Next, an intermediate point equidistant from the two points of the one end and the other end was confirmed on the first curved portion. Then, a radius of the circle contacting three points of the one end of the first curved portion, the intermediate point, and the other end, was determined, and the determined radius of the circle was the radius of curvature R1 of the first curved portion. Further, a center of the circle contacting the three points of the one end of the first curved portion, the intermediate point, and the other end, described above was the center of curvature O1 of the first curved portion. In the second curved portion, the radius of curvature R2 and the center of curvature O2 of the second curved portion were determined in the same manner.

In the honeycomb filter of Example 1, the center distance between the center of curvature O1 of the first curved portion and the center of curvature O2 of the second curved portion was 200 µm. The results are shown in the column "Center distance between two centers of curvature (µm)" in Table 1.

TABLE 1

| | Cell density (cells/cm$^2$) | Partition wall thickness (mm) | Porosity (%) | Number of curved portions | Radius of curvature R1 of first curved portion (µm) | Radius of curvature R2 of second curved portion (µm) | Center distance between two centers of curvature (µm) |
|---|---|---|---|---|---|---|---|
| Comparative Example 1 | 47 | 0.22 | 63 | 1 | 50 | — | — |
| Comparative Example 2 | 34 | 0.15 | 48 | 1 | 50 | — | — |
| Comparative Example 3 | 39 | 0.22 | 59 | 2 | 30 | 90 | 50 |
| Example 1 | 34 | 0.15 | 48 | 2 | 60 | 60 | 200 |
| Example 2 | 31 | 0.22 | 55 | 2 | 65 | 55 | 110 |
| Example 3 | 47 | 0.20 | 61 | 2 | 80 | 40 | 170 |
| Example 4 | 31 | 0.17 | 50 | 2 | 75 | 45 | 160 |
| Example 5 | 39 | 0.23 | 60 | 2 | 45 | 75 | 200 |
| Example 6 | 39 | 0.20 | 58 | 2 | 60 | 60 | 140 |
| Example 7 | 31 | 0.18 | 50 | 2 | 50 | 70 | 180 |
| Example 8 | 47 | 0.19 | 59 | 2 | 60 | 60 | 80 |
| Example 9 | 36 | 0.19 | 53 | 2 | 70 | 50 | 140 |
| Example 10 | 47 | 0.22 | 63 | 2 | 60 | 60 | 110 |
| Comparative Example 4 | 34 | 0.15 | 48 | 2 | 30 | 30 | 100 |
| Comparative Example 5 | 47 | 0.22 | 63 | 2 | 90 | 90 | 200 |
| Comparative Example 6 | 34 | 0.15 | 48 | 2 | 60 | 60 | 70 |
| Comparative Example 7 | 47 | 0.22 | 63 | 2 | 60 | 60 | 250 |

For the honeycomb filter of Example 1, "Isostatic strength evaluation", "Thermal shock resistance evaluation" and "Pressure loss performance evaluation" were performed in the following manner. The results are shown in Table 2.

Isostatic Strength Evaluation

The isostatic strength (MPa) of the honeycomb filters of Examples and Comparative Examples was measured according to the measuring method of isostatic breaking strength specified in JASO Standard M505-87, which is an automobile standard issued by Society of Automotive Engineers of Japan, Inc. The ratio (%) of the isostatic strength of each honeycomb filter when the value of isostatic strength of the honeycomb filter of Comparative Example 1 was set to 100% was calculated, and evaluation of the honeycomb filters of Examples and Comparative Examples was performed based on the following evaluation criteria. Incidentally, in the following evaluation criteria, "the isostatic strength ratio (%)" is a ratio (%) of the isostatic strength of each honeycomb filter, when the value of the isostatic strength of the honeycomb filter of Comparative Example 1 was set to 100%.
Evaluation "Excellent": If the isostatic strength ratio (%) is 140% or more, then the evaluation is determined as "Excellent".
Evaluation "Good": If the isostatic strength ratio (%) is 120% or more and less than 140%, then the evaluation is determined as "Good".
Evaluation "Acceptable": If the isostatic strength ratio (%) is 100% or more and less than 120%, then the evaluation is determined as "Acceptable".
Evaluation "Fail": If the isostatic strength ratio (%) is less than 100%, then the evaluation is determined as "Fail".

Thermal Shock Resistance Evaluation

First, a predetermined amount of soot was generated in an engine bench equipped with a 1.4 L gasoline engine at constant operating conditions, and the soot generated was deposited on the surface of the partition wall of the honeycomb filter of Examples and Comparative Examples. Next, regeneration process by post-injection was performed to increase the inlet gas temperature of the honeycomb filter, the post-injection was turned off when pressure loss before and after the honeycomb filter began to decrease, and the engine was switched to the idle state. Gradually increased the deposited amount of the predetermined amount of soot before the regeneration process, the above procedure was carried out by repeating until cracks in the honeycomb filter occur. The deposited amount of soot when cracks occur in the honeycomb filter was regarded as the "limit amount of soot deposition" in each honeycomb filter. The "thermal shock resistance evaluation" of the honeycomb filters of Examples and Comparative examples were evaluated according to the following evaluation criteria. In the following evaluation criteria, the honeycomb filter serving as a reference was set as Comparative Example 1.
Evaluation "Excellent": When the "limit amount of soot deposition" of the honeycomb filter serving as a reference is set to 100%, and if the "limit amount of soot deposition" of the honeycomb filter to be evaluated is 120% or more, then the evaluation is determined as "Excellent".
Evaluation "Good": When the "limit amount of soot deposition" of the honeycomb filter serving as a reference is set to 100%, and if the "limit amount of soot deposition" of the honeycomb filter to be evaluated is 110% or more and less than 120%, then the evaluation is determined as "Good".
Evaluation "Acceptable": When the "limit amount of soot deposition" of the honeycomb filter serving as a reference is set to 100%, and if the "limit amount of soot deposition" of the honeycomb filter to be evaluated is 100% or more and less than 110%, then the evaluation is determined as "Acceptable".
Evaluation "Fail": When the "limit amount of soot deposition" of the honeycomb filter serving as a reference is set to 100%, and if the "limit amount of soot deposition" of the honeycomb filter to be evaluated is less than 100%, then the evaluation is determined as "Fail".

Pressure Loss Performance Evaluation

Exhaust gas emitted from 1.4 L gasoline engine is allowed to flow into the honeycomb filters of Examples and Comparative Examples, the soot in the exhaust gas was trapped in the partition wall of the honeycomb filter. Trapping of the soot was carried out until the deposited amount of the soot per unit volume (1 L) of the honeycomb filter becomes 1 g/L. In the state that the deposited amount of the soot reaches 1 g/L, the engine exhaust gas at 200° C. was allowed to flow in at a flow rate of 1.0 $Nm^3$/min, and the pressures on the inflow end face side and the outflow end face side of the honeycomb filter were measured. Then, the pressure loss (kPa) of the honeycomb filter was determined by calculating the pressure difference between the inflow end face side and the outflow end face side. The ratio (%) of pressure loss of each honeycomb filter when the value of pressure loss of the honeycomb filter of Comparative Example 1 is set to 100% was calculated, and the honeycomb filters of Examples and Comparative Examples were evaluated according to the following evaluation criteria. In the following evaluation criteria, "pressure loss ratio (%)" refers to the ratio (%) of pressure loss of each honeycomb filter when the value of pressure loss of the honeycomb filter of Comparative Example 1 is set to 100%.
Evaluation "Excellent": If pressure loss ratio (%) is 80% or less, then the evaluation is determined as "Excellent".
Evaluation "Good": If pressure loss ratio (%) exceeds 80% and is 90% or less, then the evaluation is determined as "Good".
Evaluation "Acceptable": If pressure loss ratio (%) exceeds 90% and is 100% or less, then the evaluation is determined as "Acceptable".
Evaluation "Fail": If pressure loss ratio (%) exceeds 100%, then the evaluation is determined as "Fail".

TABLE 2

|  | Isostatic strength evaluation | Thermal shock resistance evaluation | Pressure loss performance evaluation |
|---|---|---|---|
| Comparative Example 1 | Base | Base | Base |
| Comparative Example 2 | Good | Fail | Excellent |
| Comparative Example 3 | Fail | Good | Acceptable |
| Example 1 | Excellent | Acceptable | Excellent |
| Example 2 | Excellent | Excellent | Acceptable |
| Example 3 | Acceptable | Acceptable | Acceptable |
| Example 4 | Excellent | Excellent | Excellent |
| Example 5 | Good | Excellent | Acceptable |
| Example 6 | Good | Good | Acceptable |
| Example 7 | Excellent | Good | Good |

TABLE 2-continued

|  | Isostatic strength evaluation | Thermal shock resistance evaluation | Pressure loss performance evaluation |
| --- | --- | --- | --- |
| Example 8 | Acceptable | Good | Acceptable |
| Example 9 | Good | Good | Good |
| Example 10 | Good | Good | Acceptable |
| Comparative Example 4 | Good | Fail | Excellent |
| Comparative Example 5 | Good | Excellent | Fail |
| Comparative Example 6 | Excellent | Fail | Excellent |
| Comparative Example 7 | Excellent | Excellent | Fail |

Examples 2 to 10

The honeycomb filters were manufactured in the same manner as the honeycomb filter of Example 1 except that the configurations of the honeycomb filters were changed as shown in Table 1.

Comparative Examples 1 to 7

The honeycomb filters were manufactured in the same manner as the honeycomb filter of Example 1 except that the configurations of the honeycomb filters were changed as shown in Table 1. In the honeycomb filters of Comparative Examples 1 and 2, the cell shape was deformed square in which each apex of the square was configured to be each one arc-shaped curved portion. In the honeycomb filters of Comparative Examples 1 and 2, the value of the radius of curvature of the curved portion at each apex of the square was shown in the column of "Radius of curvature R1 of first curved portion (μm)" in Table 1.

Results

It was confirmed that the performances of the honeycomb filters of Examples 1 to 10 exceeded the performances of Comparative Examples 1 serving as a reference, in the evaluation of "isostatic strength evaluation", "thermal shock resistance evaluation" and "pressure loss performance evaluation". Therefore, the honeycomb filters of Examples 1 to 10 are excellent in thermal shock resistance, have high isostatic strength, and can realize a reduction in pressure loss as compared with the conventional honeycomb filters.

In the honeycomb filter of Comparative Example 3, the isostatic strength evaluation was "Fail" because the center distance between the two centers of curvature was as short as 50 μm. Also in the honeycomb filter of Comparative Example 6, the isostatic strength evaluation was "Fail" because the center distance between the two centers of curvature was short. On the other hand, in the honeycomb filter of Comparative Example 7, the pressure loss performance evaluation was "Fail" because the center distance between the two centers of curvature was as long as 250 μm. In the honeycomb filter of Comparative Example 4, the thermal shock resistance evaluation was "Fail" because the values of the radius of curvature R1 of the first curved portion and the radius of curvature R2 of the second curved portion were both small. On the other hand, in the honeycomb filter of Comparative Example 5, the pressure loss performance evaluation was "Fail" because the values of the radius of curvature R1 of the first curved portion and the radius of curvature R2 of the second curved portion were both large.

Further, from the results of Examples 1 and 2, it was found that increasing the center distance of each center of curvature of the two curved portions at a specific corner increases the mass of the honeycomb filter, and thermal shock resistance is improved. From the results of Table 2, it was found that the isostatic strength was improved by providing two curved portions having a predetermined radius of curvature at specific corners of the cell.

Further, from the results of Table 2, it was confirmed that the isostatic strength tends to decrease as the thickness of the partition wall decreases. In addition, it was confirmed that the isostatic strength tended to decrease as the cell density decreases. Furthermore, it was confirmed that the isostatic strength tends to decrease as the porosity of the partition wall decreases.

INDUSTRIAL APPLICABILITY

The honeycomb filter of the present invention can be used as a filter for trapping particulate matter in exhaust gas.

DESCRIPTION OF REFERENCE NUMERALS

1: partition wall, 2: cell, 2a: inflow cell, 2b: outflow cell, 3: circumferential wall, 4: honeycomb structure body, 5: plugging portion, 6: first curved portion, 7: second curved portion, 8: connecting portion, 9: intersection, 11: inflow end face, 12: outflow end face, 13: first side (first side constituting the main outline of the deformed square), 14: second side (second side constituting the main outline of the deformed square), 15, 15': specific corner, 100: honeycomb filter, R1, R1', R2, R2': radius of curvature, O1, O1', O2, O2': center of curvature, T, T': center distance, X1: first direction, X2: second direction.

What is claimed is:
1. A honeycomb filter comprising:
a honeycomb structure body having porous partition walls disposed so as to surround a plurality of cells serving as fluid through channels extending from an inflow end face to an outflow end face; and
plugging portions disposed either at an end on the inflow end face or the outflow end face of the plurality of cells, wherein
the plurality of cells are arranged in a square grid pattern along a first direction and a second direction orthogonal to the first direction in a section orthogonal to an extending direction of the plurality of cells of the honeycomb structure body,
the shape of each cell of the plurality of cells in the section is a deformed square having a specific corner in which a part of a corner including one apex of the deformed square is lacking, an intersection of the square grid is formed by the specific corner of each of four cells of the plurality of cells arranged in the square grid pattern,
the specific corner of each cell of the plurality of cells includes a first curved portion having a radius of curvature, R1, continuous from a first side extending in the first direction of four sides constituting a main outline of the deformed square, a second curved portion having a radius of curvature, R2, continuous from a second side extending in the second direction of the four sides, and a connecting portion connecting the first curved portion and the second curved portion, the radius of curvature, R1, of the first curved portion and the radius of curvature, R2, of the second curved portion is 40 to 80 μm, respectively, and a center distance between a center of curvature, O1, of the first curved portion and a center of curvature, O2, of the second curved portion is 80 to 200 μm.

2. The honeycomb filter according to claim 1, wherein a porosity of the porous partition walls is 45 to 65%.

3. The honeycomb filter according to claim 1, wherein a thickness of the porous partition walls is 0.15 to 0.26 mm.

4. The honeycomb filter according to claim 1, wherein a cell density of the honeycomb structure body is 30 to 50 cells/cm$^2$.

* * * * *